(12) United States Patent
Wright et al.

(10) Patent No.: US 9,835,794 B1
(45) Date of Patent: *Dec. 5, 2017

(54) LIGHT EMITTING DIODE TO LIGHT EMITTING PANEL INTERFACE GASKET

(71) Applicant: Cooper Technologies Company, Houston, TX (US)

(72) Inventors: Timothy Glen Wright, Peachtree City, GA (US); Scott David Wegner, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,326

(22) Filed: May 10, 2016

Related U.S. Application Data

(63) Continuation of application No. 13/828,349, filed on Mar. 14, 2013, now Pat. No. 9,341,346.

(60) Provisional application No. 61/737,494, filed on Dec. 14, 2012.

(51) Int. Cl.

| | |
|---|---|
| F21V 7/04 | (2006.01) |
| F21V 8/00 | (2006.01) |
| F21V 31/00 | (2006.01) |
| F21V 17/10 | (2006.01) |
| F21V 29/74 | (2015.01) |
| F21W 131/10 | (2006.01) |
| F21Y 115/10 | (2016.01) |

(52) U.S. Cl.
CPC ............ *G02B 6/0093* (2013.01); *F21V 17/10* (2013.01); *F21V 29/74* (2015.01); *F21V 31/005* (2013.01); *G02B 6/0031* (2013.01); *G02B 6/0085* (2013.01); *F21W 2131/10* (2013.01); *F21Y 2115/10* (2016.08)

(58) Field of Classification Search
CPC .. G02B 6/0011; G02B 6/0013; G02B 6/0066; G02B 6/0081; G02B 6/0091; G02B 6/0093; F21V 31/005; F21V 17/10; F21V 17/102; F21V 17/104
See application file for complete search history.

(56) References Cited

U.S. PATENT DOCUMENTS

| | | | |
|---|---|---|---|
| 4,697,861 A | 10/1987 | Mitchell | |
| 5,211,464 A | 5/1993 | Bohmer | |
| 6,705,033 B1* | 3/2004 | Greene | G02B 6/0036 40/542 |
| 7,182,500 B2 | 2/2007 | Sugawara | |
| 7,413,338 B2 | 8/2008 | Pan | |
| 7,505,668 B2 | 3/2009 | Hong | |
| 7,513,072 B2 | 4/2009 | Karisson | |
| 7,771,108 B2 | 8/2010 | Iwasaki | |
| 2007/0047255 A1 | 3/2007 | Wang | |
| 2012/0212977 A1 | 8/2012 | Montfort et al. | |
| 2012/0281151 A1* | 11/2012 | Abe | G02B 6/0091 348/739 |

* cited by examiner

*Primary Examiner* — Alexander Garlen
(74) *Attorney, Agent, or Firm* — King & Spalding LLP

(57) ABSTRACT

A gasket for an interface between a light emitting diode (LED) and a light emitting panel (LEP) includes a first segment and a second segment. The gasket also includes a first blade extending out from a surface of the first segment and a second blade extending out from a surface of the second segment. The surface of the first segment faces the surface of the second segment.

20 Claims, 7 Drawing Sheets

LIGHT EMITTING DIODE TO LIGHT EMITTING PANEL INTERFACE GASKET

RELATED APPLICATIONS

The present application is a continuation of and claims priority to U.S. patent application Ser. No. 13/828,349, filed Mar. 14, 2013, and titled "Light Emitting Diode To Light Emitting Panel Interface Gasket," which claims priority to U.S. Provisional Patent Application No. 61/737,494, filed Dec. 14, 2012, and titled "Light Emitting Diode To Light Emitting Panel Interface Gasket," the entire contents of which are incorporated herein by reference.

TECHNICAL FIELD

The present disclosure relates generally to a lighting fixture gasket, in particular to a gasket for use at an interface between a light emitting diode (LED) and a light emitting panel (LEP).

BACKGROUND

A light fixture may include an LED and an LEP (which is also generally referred to as a waveguide) that are positioned within a light fixture structure such as a metal (e.g., aluminum) frame, housing or cover. The LEP may illuminate a space around the LEP based on lumen transfer from the LED to the LEP. The LEP may receive light from the LED through an edge of the LEP and emit out the light through a broad side of the LEP. To achieve a desired lumen transfer from the LED to the LEP, the LED and the LEP need to be maintained within a certain distance from each other. Because a gap between the LED and the LEP may change in response to changes in temperature of the LEP, the initial gap size needs to be selected based on a particular temperature range the LEP may experience. For example, a gap of about 0.015 inches between the LED and the LEP may enable approximately 93% lumen transfer from the LED to the LEP. However, the gap between the LED and the LEP may increase if the LEP shrinks away from the LED at lower temperatures, resulting in a less efficient lumen transfer between the LED and the LEP.

While a large gap between the LED and the LEP may result in inefficient lumen transfer from the LED to the LEP, a small gap may cause the LEP to bend due to lack of lateral space for thermal expansion. For example, as the temperature of the LEP increases, the LEP may expand and come in contact with the LED, possibly causing a failure of the LED if the LEP continues to expand. Once the LEP comes in contact with the LED, further thermal expansion of the LEP may also result in bending or fracturing of the LEP. An LEP that is bent may distort light and result in uneven distribution of light emanating from the LEP. Further, frequent bending of the LEP may cause mechanical stress of the LEP, resulting in cracking and/or deformation of the LEP. In addition, to allow the LEP to expand and shrink within the light fixture in response to temperature changes, the light fixture generally includes mechanical assemblies with springs or slotted screw holes.

Accordingly, a structure that will maintain or improve lumen transfer from the LED to the LEP without experiencing excessive mechanical stress is desirable.

BRIEF DESCRIPTION OF THE DRAWINGS

Reference will now be made to the accompanying figures, which are not necessarily to scale, and wherein.

Figure 1A:
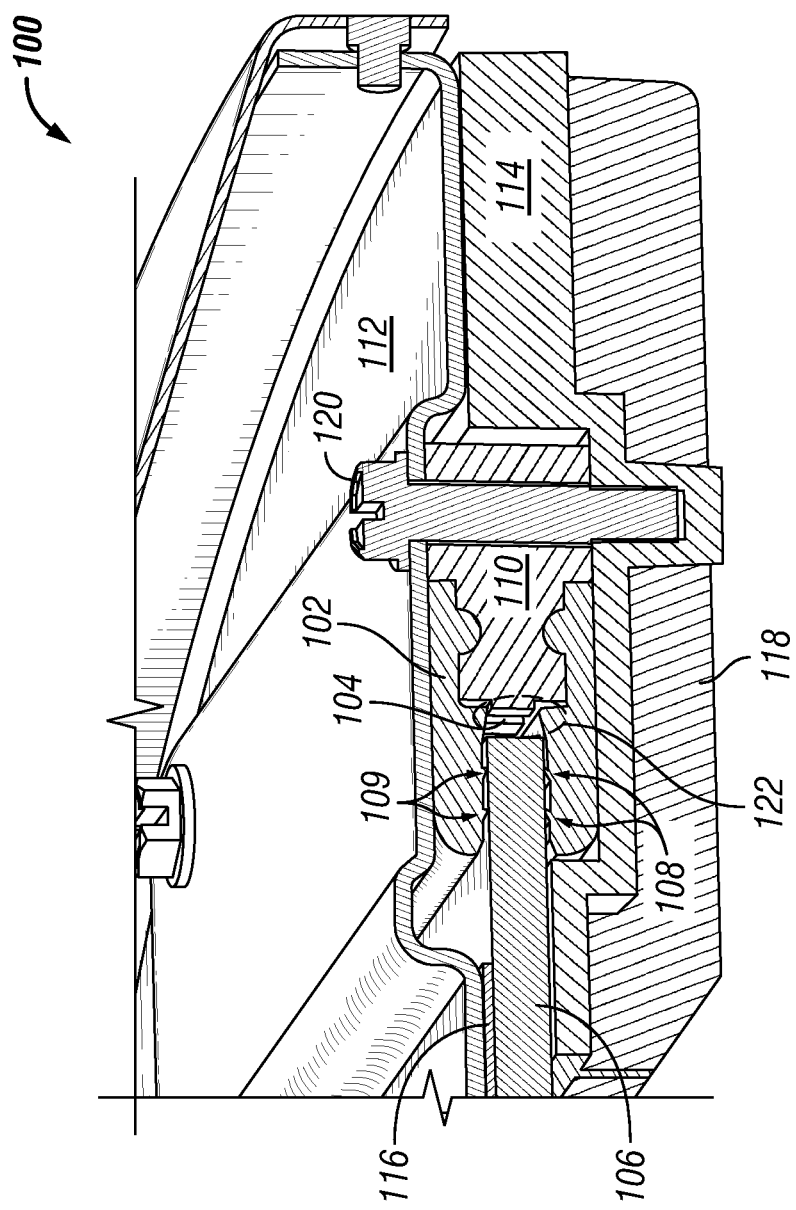
FIGS. 1A and 1B are diagrams of cross sectional views of a light fixture including a gasket including blade structures according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

SUMMARY

The present disclosure relates to a gasket for use at an interface between a light emitting diode (LED) and a light emitting panel (LEP). In an example embodiment, a gasket for an interface between a light emitting diode (LED) and a light emitting panel (LEP) includes a first segment and a second segment. The gasket also includes a first blade extending out from a surface of the first segment and a second blade extending out from a surface of the second segment. The surface of the first segment faces the surface of the second segment.

In another example embodiment, a light fixture includes a light emitting panel (LEP), an LED, and a gasket. The LED and a light receiving edge of the LEP are positioned adjacent to each other within the gasket. The gasket includes a first segment and a second segment. The gasket also includes a first blade extending out from a surface of the first segment, and a second blade extending out from a surface of the second segment. The surface of the first segment faces the surface of the second segment. The LED and a light receiving edge of the LEP are positioned adjacent to each other between the surface of the first segment and the surface of the second segment.

In another example embodiment, a light fixture includes a light emitting panel (LEP), an LED, and a gasket. The gasket has blades on an inner surface of the gasket. The LED and a light receiving edge of the LEP are positioned adjacent to each other surrounded by the inner surface of the gasket. The light fixture further includes a first light fixture frame attached to a first outer surface of the gasket, and a second light fixture frame attached to second outer surface of the gasket.

These and other aspects, objects, features, and embodiments will be apparent from the following description and the appended claims.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 1B:
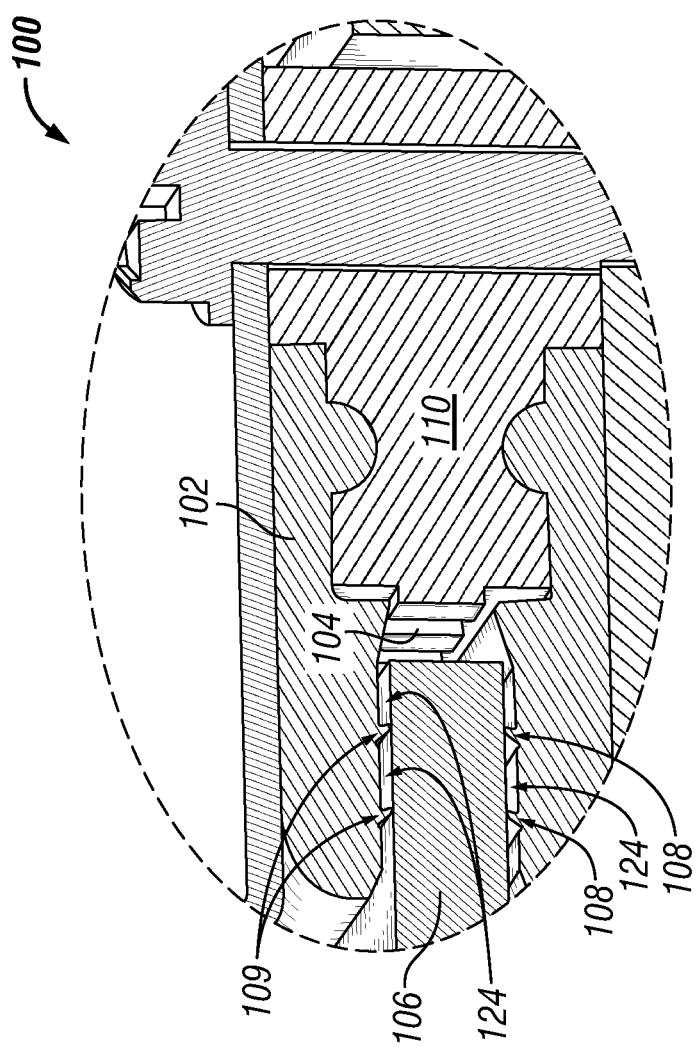

Turning now to the figures, particular embodiments are described. FIGS. 1A and 1B illustrate cross sectional views of a light fixture 100 including a gasket 102 according to an example embodiment. The light fixture 100 is operable to illuminate a space around the light fixture 100. The light fixture 100 includes a light emitting diode (LED) 104 and a light emitting panel (LEP) 106. The LEP 106 is positioned in proximity to the LED 104. The LED 104 may include one or more LEDs (e.g., an array of LEDs) as light sources and may be attached to a circuit board. The LED 104 and a portion of the LEP 106 are positioned within the gasket 102. For example, a light receiving edge of the LEP 106 may be positioned adjacent to and facing the LED 104. The light receiving edge of the LEP 106 may receive light from the LED 104, and the LEP 106 may emit the light from the LED 104 through one or both broad sides of the LEP 106.

In an example embodiment, an upper frame 112 of the light fixture 100 is positioned above the gasket 102 and the LEP 106. A light reflector 116 is positioned between a portion of the upper frame 112 and the LEP 106. For example, the light reflector 116 may be attached to a broad side of the LEP 106 facing the upper frame 112 and may reflect light to the other broad side of the LEP 106 facing an area to be illuminated. A lower frame 114 of the light fixture 100 is positioned below the gasket 102. A portion of an LED heat conductor 110 is positioned within the gasket 102 and another portion of the LED heat conductor 110 is positioned outside the gasket 102 and is in contact with the upper frame 112 and the lower frame 114 of the light fixture 100. The LED heat conductor 110 allows heat from the LED 104 to transfer to the upper frame 112 and to the lower frame 114 of the light fixture 100.

In an example embodiment, the LEP 106 may be made from an acrylic material. The upper frame 112 and the lower frame 114 of the light fixture 100 may be made from a metal such as aluminum, steel, or a combination thereof. The upper frame 112 and the lower frame 114 may be attached to each other, for example, by a fastener 120 that passes through the LED heat conductor 110. In some embodiments, a heat sink designed to dissipate heat may be attached to an outside surface of the lower frame 114 of the light fixture 100.

The gasket 102 may be reflective and may be positioned to reflect light from the LED 104 to the LEP 106. In particular, the gasket 102 may reflect light from the LED 104 to the light receiving surface of the LEP 106. The gasket 102 may be made from silicone, rubber, ethylene propylene diene monomer (EPDM), neoprene, or similar white, diffusely reflective or specularly reflective material. In an example embodiment, the gasket 102 may be metallic in color, white, or clear to reduce loss of light caused by surface contact between the LED 104 and the LEP 106.

The gasket 102 includes blades 108, 109 on each inner surface of the gasket 102 extending out from each inner surfaces of the gasket 102, as described below with respect to FIGS. 2 and 3. The blades 108, 109 are designed to reduce contact between the inner surfaces of the gasket 102 and the LEP 106. In particular, the blades 108, 109 are configured to reduce contact between the inner surfaces of the gasket 102 and the broad sides of the LEP 106. As more clearly shown in FIG. 1B, one or more air gaps 124 are formed between the inner surfaces of the gasket 102 and the broad sides of the LEP 106. By reducing contact between the surfaces of the gasket 102 and broad sides of the LEP 106, light transfer from the LEP at the points of contact with the gasket 102 may be limited.

Although the blades 108, 109 are shown angled towards the LED 104 in FIGS. 1A and 1B, in alternative embodiments, one or more of the blades 108, 109 may be angled in a different direction. Further, while FIGS. 1A and 1B illustrate two blades on each inner surface of the gasket 102, in alternative embodiments, more or fewer than two blades may extend from each of the inner surfaces of the gasket 102. Further, the gasket 102 may be designed to accommodate light emitting panels (LEPs) of different sizes. For example, the gasket 102 may be sized to fit LEPs of different thicknesses and widths.

In an example embodiment, the gasket 102 may be white or metallic in color to improve the LED 104 to the LEP 106 interface efficiencies as the gap 122 varies in size due to thermal and mechanical changes. Light that escapes or does not enter into the LEP 106 at the interface area (i.e., at the gap 122) between the LED 104 and the LEP 106 may be reflected back to the LEP 106 by the reflective color of the gasket 102.

Because the gasket 102 reflects light from the LED 104 that would otherwise be lost without using the gasket 102 and thus limiting light loss, a gap (panel offset) 122 between the LED 104 and the LEP 106 (in particular, the light receiving edge of the LEP 106) may be increased while maintaining acceptable lumen transfer from the LED 104 to the LEP 106. For example, the gap 122 may be in the range of 0.06" to 0.10" with the gasket 102 instead of being limited to 0.002" to 0.015" without the gasket 102. As the temperature of the LEP 106 increases, the LEP 106 may expand towards the LED 104 between the top and bottom sides of the gasket 102. Because the gap 122 may be sized to be large enough to accommodate expected expansion of the LEP 106 while maintaining acceptable lumen transfer from the LED 104 to the LEP 106, the LEP 106 does not come in contact with the LED 104 when the temperature of the LEP 106 increases. In turn, because the LEP 106 does not come in contact with the LED 104 after going through thermal expansion, bending of the LEP 106 and structural damage to the light fixture 100 may be avoided. In some embodiments, the gap 122 may be sized to reduce but not eliminating bending of the LEP 106.

Because the gasket 102 enables improved lumen transfer from the LED 104 to the LEP 106 by reflecting light from the LED and limiting undesired light leakage at the points where the gasket contacts the LEP 106, the gap 122 between the LED 104 and the LEP 106 may be increased in comparison to a corresponding gap in a light fixture that does not include the gasket 102. Without the gasket 102 and without the increased size of the gap 122, even if an outer metal (e.g., aluminum) structure of a light fixture attached to the LED 104 expands pushing the LED 104 away from the LEP 106, the LEP 106 would still likely come in contact with the LED 104 because of the higher coefficient of thermal expansion of the LEP 106, which is commonly made of an acrylic material, as compared to the coefficient of thermal expansion of the outer metal structure.

To illustrate, the thermal expansion over a 20" length and a 90 deg C. temperature change is 0.13" for acrylic (Polymethyl methacrylate or PMMA) and only 0.04" for aluminum. Thus, by using the gasket 102, the increased size of the gap 122 can allow thermal expansion of the LEP 106 without causing the LEP 106 to bend and while achieving a desirable lumen transfer between the LED 104 and the LEP 106.

Further, the gasket 102 helps maintain a desirable lumen transfer between the LED 104 and the LEP 106 when the gap 122 is increased due to decreases in temperature, such as when the light fixture 100 is used in a cold temperature environment. Because, the gasket 102 is reflective, light from the LED 104 that would otherwise be lost due to the increased size of the gap 122 may be reflected back to the LEP 106 and thus minimizing reduction in lumen transfer between the LED 104 and the LEP 106. In addition, the gasket substantially eliminates dust and water intrusion into the interface between the LED 104 and the LEP 106 and thus protecting the both the LED 104 and the LEP from damage.

Figure 2:
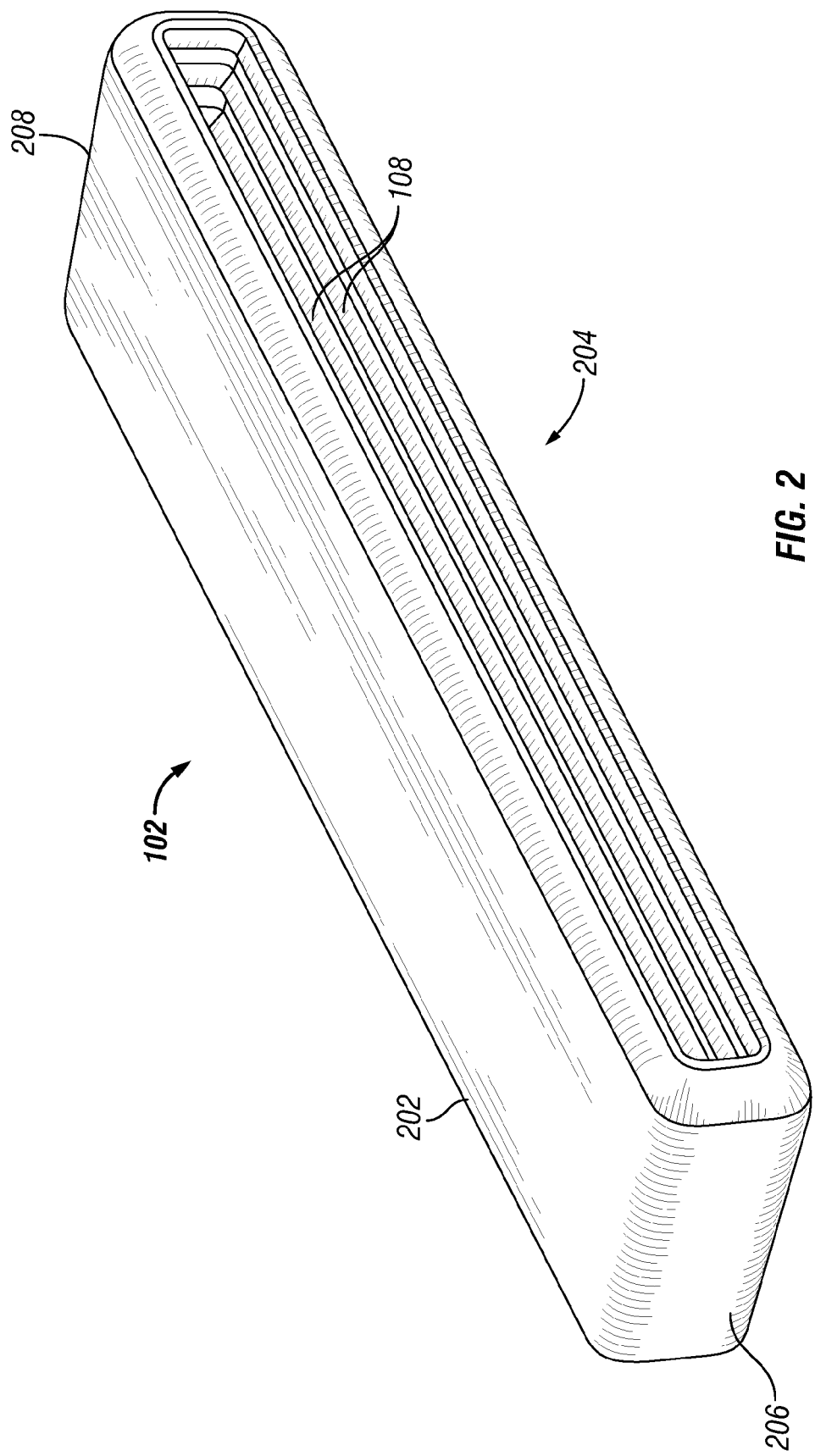
FIG. 2 is a diagram of a perspective view of an example embodiment of the gasket illustrated in FIGS. 1A and 1B.

FIG. 2 is a perspective view of a particular embodiment of the gasket 102 illustrated in FIGS. 1A and 1B. The gasket 102 includes an upper segment 202, a lower segment 204, a first end segment 206, and a second end segment 208. The inner surface of the upper segment 202 faces the inner surface of the lower segment 204. The lower segment 204 includes the blades 108 that extend out from an inner surface of the lower segment 204 and that extend longitudinally along the length of the lower segment 204. As illustrated in FIGS. 1 and 3, the upper segment 202 also includes blades 109 that extend out from the inner surface of the upper segment 202 and that extend longitudinally along the length of the upper segment 202 in a manner similar to the blades 108.

In an example embodiment, the first end segment 206 and the second end segment 208 are configured to reflect light generated by the LED 104 of FIGS. 1A and 1B and to enable efficient lumen transfer between the LED 104 and the LEP 106. For example, the side edges of the LEP 106 of FIGS. 1A and 1B may be come contact with the inner surfaces of the first end segment 206 and the second end segment 208 when the light receiving edge of the LEP 106 is positioned within the gasket 102. Although FIG. 2 shows that the first end segment 206 and the second end segment 208 have curved corners, in alternative embodiments, the first end segment 206 and the second end segment 208 may have other shapes without departing from the scope of this disclosure. The first end segment 206 and the second end segment 208 can be made separate from the upper segment 202 and the lower segment 204, and subsequently attached thereon. Alternatively, the first end segment 206 and the second end segment 208 can be made integrally with one or both of using. The gasket 102 as a whole or the individual segments can be produced using methods such as injection molding or other methods known to those of ordinary skill in the art.

Figure 3:
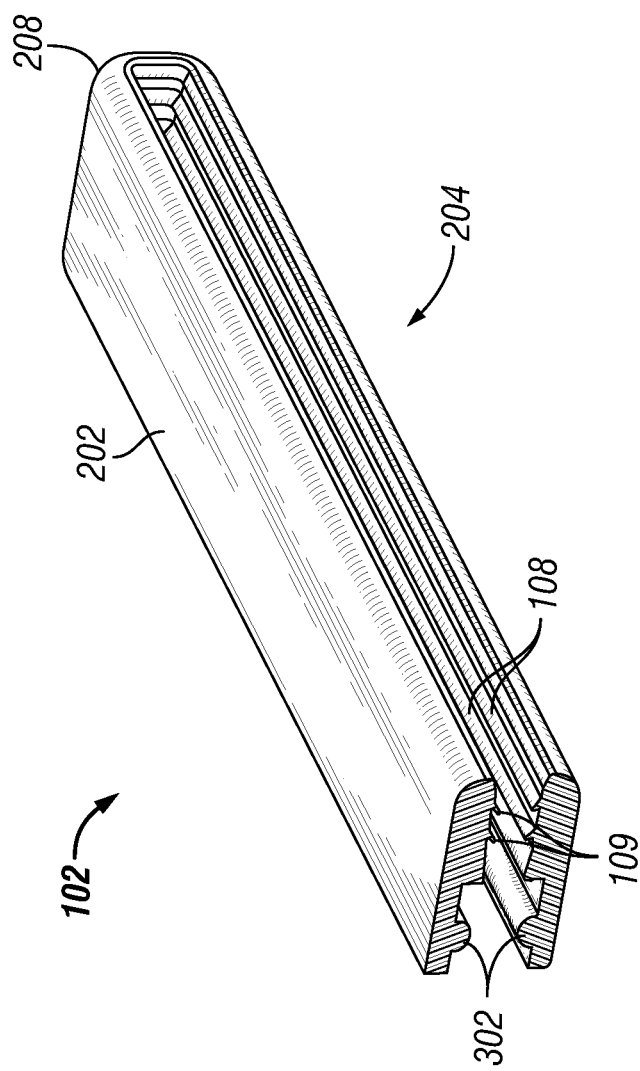
FIG. 3 is a diagram of a perspective view of an example embodiment of the gasket of FIGS. 1-3 illustrating a cross-section of the gasket.

FIG. 3 illustrates a cross-sectional view of the gasket 102 of FIGS. 1A, 1B, and 2. The gasket 102 includes protrusions 302 that enable positioning of the LED heat conductor 110 of FIGS. 1A and 1B against the LED 104 between the upper segment 202 and the lower segment 204. In an example embodiment, the gasket 102 is configured to receive the LED 104 between the inner surface of the upper segment 202 and the inner surface of the lower segment 204, where the LED 104 may be positioned adjacent to the light receiving edge of the LEP 106 as shown in FIGS. 1A and 1B. The inner surface of the upper segment 202 includes blades 109 that extend longitudinally along a portion the length of the upper segment 202. The inner surface of the lower segment 204 similarly includes the blades 108 that extend longitudinally along a portion of the length of the lower segment 204. In an example embodiment, the blades 109 extend longitudinally along the entire length of the upper segment 202, and the blades 108 extend longitudinally along the entire length of the lower segment 204. As illustrated in FIGS. 1A and 1B, the blades 109 come in contact with a broad side of the LEP 106, and the blades 108 come in contact with the other broad surface of the LEP 106.

As described with respect to FIGS. 1A and 1B, the blades 108, 109 are designed to reduce contact between the inner surfaces of the gasket 102 and the LEP 106. To illustrate, the blades 109 form air gaps 124 between the surface of the upper segment 202 and the upper broad surface of the LEP 106, and the blades 108 form air gaps 124 between the surface of the lower segment 204 and the lower broad surface of the LEP 106. By reducing contact between the inner surfaces of the gasket 102 and LEP 106, light leakage from the LEP 106 at the points of contact with the gasket 102 may be limited, for example, due to the air gaps 124 between the LEP 106 and the inner surfaces of the gasket 102. That is, the blades 108 permit a layer of air between a majority of the inner surfaces of the gasket 102 and the outer surfaces of the LEP 106. Light within the LEP 106 will not exit the LEP 106, due to total internal reflection (TIR), along those surfaces with the layer of air in the air gap 124 due to the lower refractive index of air as compared to the effective index of refraction of any other denser material in contact with the LEP 106 that will interrupt the TIR within the LEP 106.

Although FIG. 3 illustrates two blades on the inner surface of each of the upper segment 202 and the lower segment 204, in alternative embodiments, more or fewer than two blades may extend from the inner surface of each of the upper segment 202 and the lower segment 204. For example, the upper segment 202 may have one blade, and the lower segment 204 may have one blade. Further, although a particular configuration of the blades 108 and protrusions 302 are illustrated in FIG. 3, in alternative embodiments, the blades 108 may be slanted in a different direction. Furthermore, one or all of the protrusions 302 may be omitted or more protrusions may be included.

Figure 4:
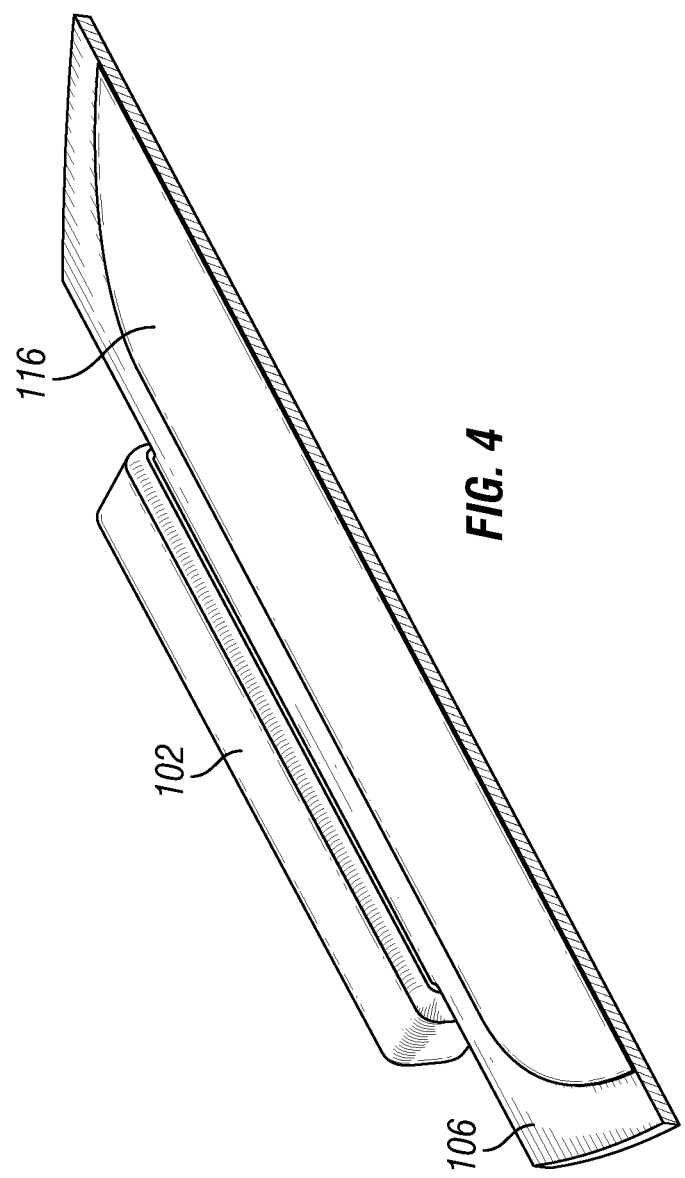
FIG. 4 is a diagram of an example embodiment of the gasket of FIGS. 1-3 engaged with a light emitting panel (LEP)

FIG. 4 illustrates the gasket 102 of FIGS. 1A, 1B, 2, and 3 engaged with the LEP 106 of FIGS. 1A and 1B. As shown in FIG. 4, a portion of the LEP 106 is inserted into the gasket 102. An LED, such as the LED 104 of FIGS. 1A and 1B, may be positioned in the gasket 102 through an opening of the gasket 102 opposite where the LEP 106 is positioned. The light reflector 116 covers a portion of the LEP 106.

Figure 5:
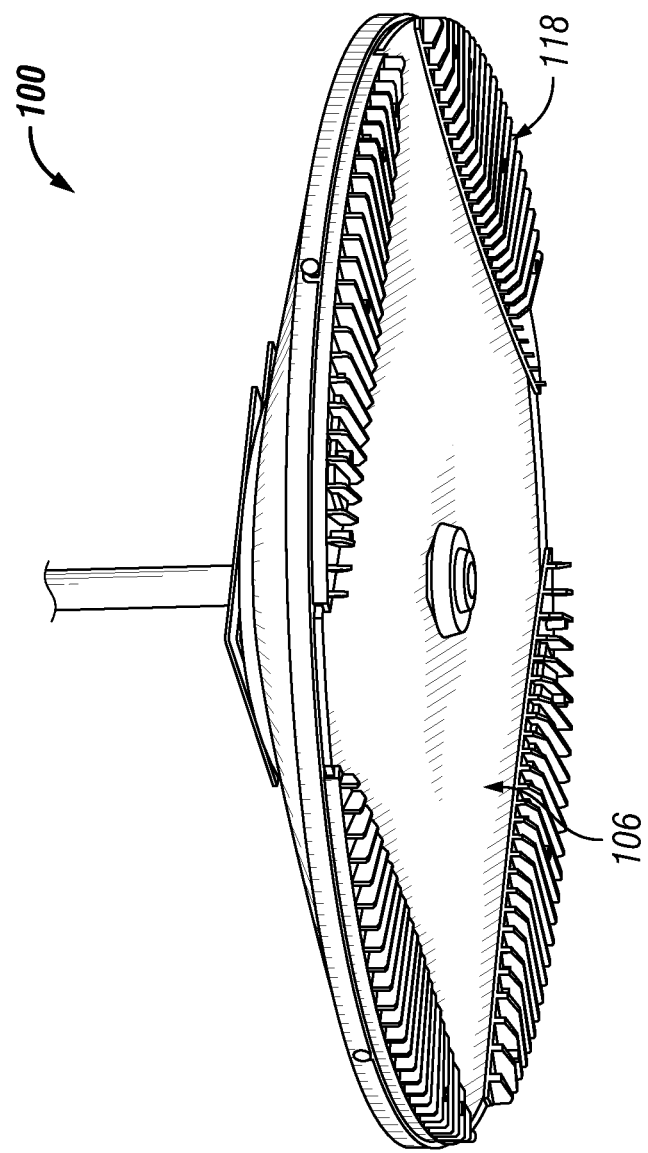
FIG. 5 is a diagram of an example embodiment of a light fixture that includes the gasket of FIGS. 1A, 1B, and 2-4.

FIG. 5 illustrates an example embodiment of the light fixture 100 of FIGS. 1A and 1B that includes the gasket 102 of FIGS. 1A, 1B, and 2-4. As shown in FIG. 5, the LEP 106 is positioned such that the light fixture 100 emits light to illuminate an area below the light fixture 100. The heat sink 118 serves to dissipate heat from the LED 104 illustrated in FIGS. 1A and 1B. The gasket 102 (shown in FIGS. 1A and 1B) is positioned above the heat sink 118.

Although FIG. 5 shows the light fixture 100 oriented to illuminate an area below the light fixture 100, in alternative embodiments, the light fixture 100 may be oriented differently.

Figure 6:
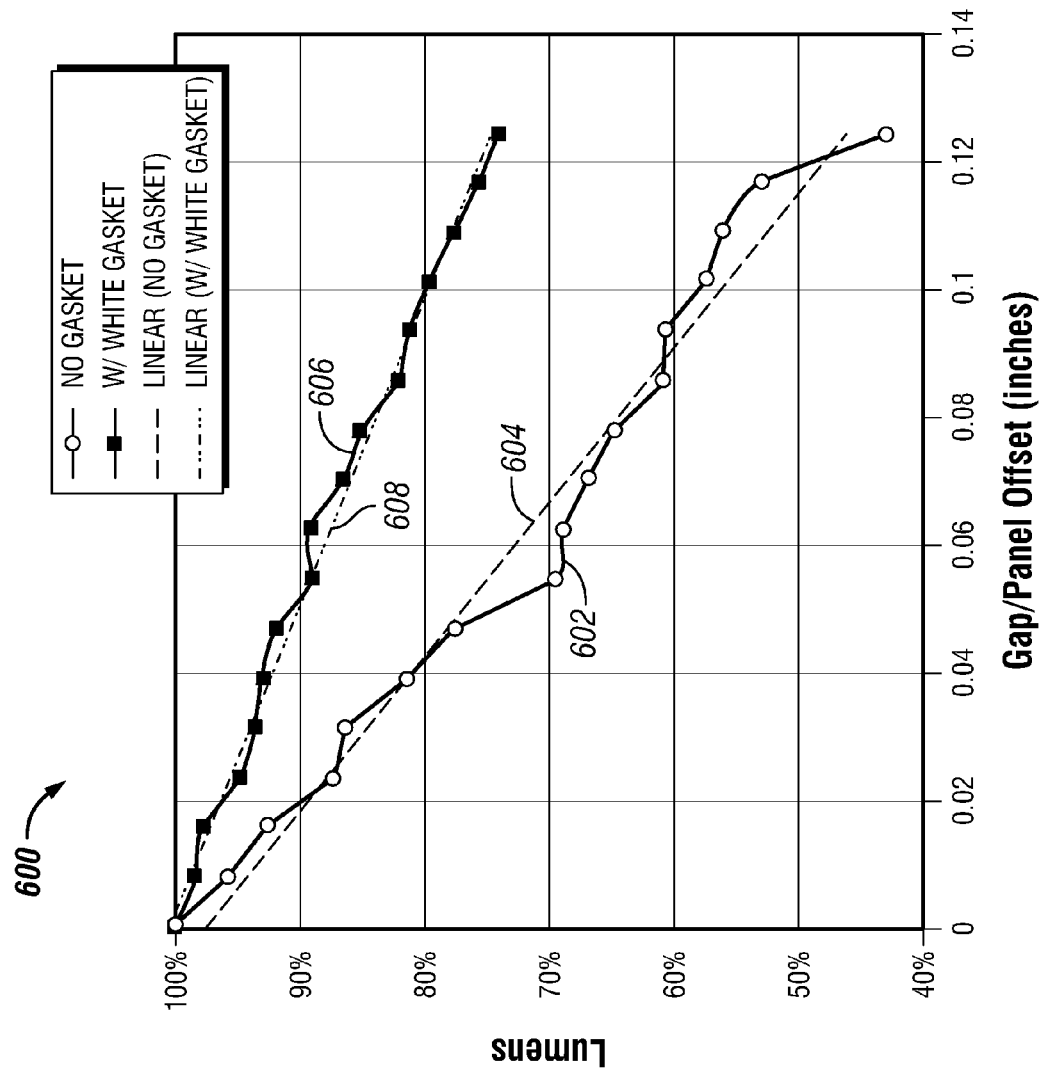
FIG. 6 is a graph showing comparison of lumen transfer with the gasket of FIG. 2 and without a gasket.

FIG. 6 illustrates a graph 600 comparing the lumen transfer between the LED 104 and the LEP 106 with and without the gasket 102 as a function of the size of the gap 122 shown in FIG. 1A. The curve 602 connects discrete points corresponding to percentage of lumen transfer from the LED 104 to the LEP 106 when no gasket is used to cover the interface between the LED 104 and the LEP 106. The curve 604 is a linear curve corresponding to the curve 602. The curve 606 shows discrete points corresponding to percentage of lumen transfer from the LED 104 to the LEP 106 when the gasket 104 is used to cover the interface between the LED 104 and the LEP 106. The curve 608 is a linear curve corresponding to the curve 606. As illustrated by the graph 600, the lumen transfer from the LED 104 to the LEP 106 when using the gasket 102 is greater than when the gasket 102 is not used. For example, when the gap size is 0.04 inches, the lumen transfer is at approximately 93% when the gasket 102 is used as compared to approximately 81% when no gasket is used.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. An outdoor light fixture, comprising:
    a gasket comprising a first blade and a second blade, wherein the first blade and the second blade extend out from a surface of the gasket and extend longitudinally along a length of the gasket;
    a light emitting panel (LEP);
    an upper frame;
    a lower frame, wherein the upper frame covers a portion of a first broad side of the LEP, wherein the lower frame covers a portion of a second broad side of the LEP, wherein the gasket is positioned between the lower frame and the upper frame, and wherein the upper frame and the lower frame are coupled to each other by a fastener; and
    a light emitting diode (LED) disposed proximal to a light receiving edge of the LEP, wherein the first blade and the second blade come in contact with a broad surface of the LEP, wherein the first blade and the second blade each have a first side and a second side that are slanted in a same direction relative to the light receiving edge of the LEP and tapering toward each other as the first blade and the second blade extend toward the broad surface of the LEP, and wherein the LED and the light receiving edge of the LEP are in an interior of the gasket.

2. The outdoor light fixture of claim 1, wherein the gasket comprises:
    a first segment; and
    a second segment, wherein the first blade and the second blade extend out from a surface of the first segment.

3. The outdoor light fixture of claim 2, wherein the gasket is further configured to receive the LED between the surface of the first segment and a surface of the second segment for positioning adjacent to the light receiving edge of the LEP.

4. The outdoor light fixture of claim 1, further comprising:
    a third blade and a fourth blade extending out from the second segment and positioned substantially parallel to the first blade.

5. The outdoor light fixture of claim 1, wherein the gasket is configured to reflect light.

6. The outdoor light fixture of claim 1, further comprising a light reflector disposed between the upper frame and the LEP on the first broad side of the LEP.

7. The outdoor light fixture of claim 1, wherein the first blade and the second blade form an air gap between the surface of the first segment and the broad surface of the LEP.

8. The outdoor light fixture of claim 1, wherein the first side and the second side of the first blade are slanted towards the light receiving edge of the LEP.

9. An outdoor light fixture, comprising:
    a gasket comprising a first blade and a second blade, wherein the first blade and the second blade extend out from a surface of the gasket and extend longitudinally along a length of the gasket;
    a light emitting panel (LEP);
    an upper frame;
    a lower frame, wherein the upper frame covers a portion of the first broad side of the LEP, wherein the lower frame covers a portion of the second broad side of the LEP, wherein the gasket is positioned between the lower frame and the upper frame, and wherein the upper frame and the lower frame are coupled to each other by a fastener; and
    a light emitting diode (LED) disposed proximal to a light receiving edge of the LEP, wherein the first blade and the second blade come in contact with a broad surface of the LEP, wherein the first blade and the second blade each have a first side and a second side that are slanted in a same direction relative to the light receiving edge of the LEP and tapering toward each other as the first blade and the second blade extend away from the surface of the gasket toward the broad surface of the LEP, wherein the gasket covers the LED and the light receiving edge of the LEP.

10. The outdoor light fixture of claim 9, wherein the gasket comprises:
    a first segment; and
    a second segment, wherein the first blade and the second blade extend out from a surface of the first segment.

11. The outdoor light fixture of claim 10, wherein the gasket is further configured to receive the LED between the surface of the first segment and a surface of the second segment for positioning adjacent to the light receiving edge of the LEP.

12. The outdoor light fixture of claim 9, further comprising:
    a third blade and a fourth blade extending out from the second segment and positioned substantially parallel to the first blade.

13. The outdoor light fixture of claim 9, wherein the gasket is configured to reflect light.

14. The outdoor light fixture of claim 9, further comprising a light reflector disposed between the upper frame and the LEP on the first broad side of the LEP.

15. The outdoor light fixture of claim 9, wherein the first blade and the second blade form an air gap between the surface of the first segment and the broad surface of the LEP.

16. The outdoor light fixture of claim 9, wherein the first side and the second side of the first blade are slanted towards the light receiving edge of the LEP.

17. An outdoor light fixture, comprising:
    a gasket comprising a first blade and a second blade, wherein the first blade and the second blade extend out from a surface of the gasket and extend longitudinally along a length of the gasket;
    a light emitting panel (LEP);
    an upper frame;
    a lower frame coupled to the upper frame, wherein the upper frame covers a portion of a first broad side of the LEP, wherein the lower frame covers a portion of a second broad side of the LEP, wherein the gasket is positioned between the lower frame and the upper frame; and a light emitting diode (LED) disposed proximal to a light receiving edge of the LEP, wherein the first blade and the second blade come in contact with a broad surface of the LEP, wherein the first blade and the second blade each have a first side and a second side that are slanted in a same direction relative to the light receiving edge of the LEP and tapering toward each other as the first blade and the second blade extend away from the surface of the gasket toward the broad surface of the LEP, wherein the gasket covers the LED and the light receiving edge of the LEP.

18. The outdoor light fixture of claim 9, wherein the gasket comprises:
   a first segment; and
   a second segment, wherein the first blade and the second blade extend out from a surface of the first segment.

19. The outdoor light fixture of claim 10, wherein the gasket is further configured to receive the LED between the surface of the first segment and a surface of the second segment for positioning adjacent to the light receiving edge of the LEP.

20. The outdoor light fixture of claim 9, further comprising:
   a third blade and a fourth blade extending out from the second segment and positioned substantially parallel to the first blade.

\* \* \* \* \*